Nov. 4, 1958 E. COOKE 2,859,007
GARDEN HOSE HOLDER
Filed Nov. 10, 1955
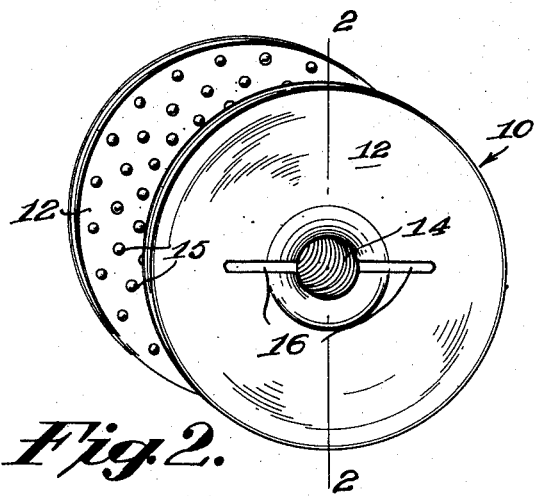
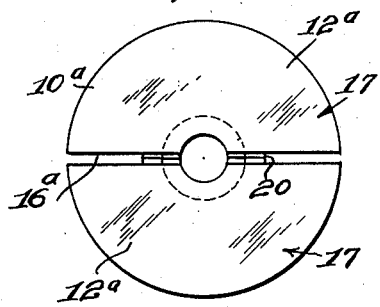
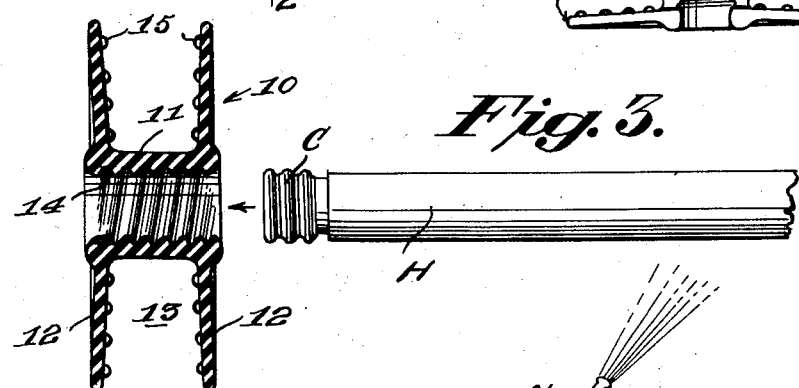
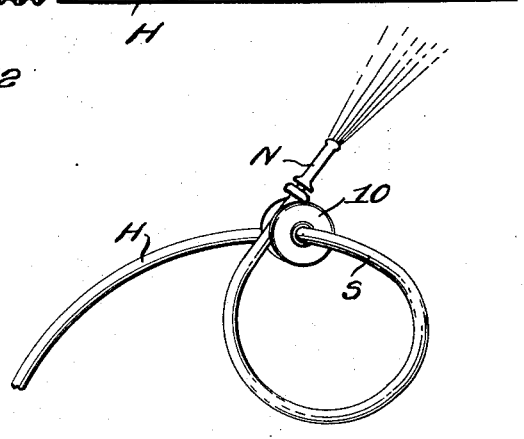
INVENTOR
Edison Cooke.
BY
ATTORNEY

United States Patent Office 2,859,007
Patented Nov. 4, 1958

2,859,007

GARDEN HOSE HOLDER

Edison Cooke, St. Catherines, Ontario, Canada

Application November 10, 1955, Serial No. 546,228

3 Claims. (Cl. 248—75)

This invention relates to a garden hose holder.

The invention is more particularly concerned with a device adapted to be threaded over the end of a garden hose and supported thereon adjacent a nozzle on the end of the hose whereby the hose is capable of being supported on the ground with the nozzle inclined upwardly in a spraying position.

It is a primary object of the invention to provide a garden hose supporting device which is of highly simple construction and which is capable of use without any particular skill or effort on the part of a user thereof.

A further and more specific object of the invention is the provision of a garden hose supporting device characterized in that the hose is capable of being extended therethrough and with a nozzle on the hose supported thereby.

Other objects and advantages of the invention will become apparent in the course of the following detailed description, taken in connection with the accompanying drawing, wherein—

Fig. 1 is a perspective view of the improved device in accordance with a preferred structural embodiment thereof.

Fig. 2 is a diametrical sectional view as observed in the plane of line 2—2 on Fig. 1.

Fig. 3 is a side elevational view of the nozzle end portion of a hose with which the device is operatively associated.

Fig. 4 is a persepective view on a substantially reduced scale showing the improved device in use.

Fig. 5 is a side elevational view of a second embodiment of the invention.

Fig. 6 is a top plan view of one of the two sections embodied in the structure of Fig. 5.

Referring now in detail to the drawing and first to Figs. 1 to 4 thereof, the improved device will be seen to comprise a single unitary body member 10 which is preferably constructed of rubber as indicated.

The body member 10 comprises a central hub 11 and a pair of concavo-convex discs 12, one adjacent each end of the hub and with the convex sides of the disks opposing each other thereby providing a hose receiving annular channel 13 having inwardly inclined walls defined by the inner sides of the discs. The hub 11 is threaded as indicated at 14 and the inner diameter of the threaded portion is slightly smaller than the diameter of a hose H whereby same will be tightly griped by the device 10 when same is disposed in the hub as in Fig. 4 and while the threaded male hose coupling C is of slightly greater diameter than the hose, same is capable of being readily threaded through the hub 10 which, due to the material of the device, is capable of substantial yielding.

The opposed inner walls of the discs 12 are provided with a multiplicity of projections or knobs 15 for effecting retention of a section of the hose within the channel 13.

In order to provide greater yielding of the device in the application thereof to the hose H, the discs 12 may be provided with diametrical slots 16 as indicated in Fig. 1.

In the use of the improved device the coupling C is extended through the hub 11 in the direction of the arrow in Figs. 2 and 3 and thereafter a section S of the hose is pulled through the hub and the nozzle N, then secured to the coupling C, whereupon the hose H immediately adjacent the nozzle N is pressed into the channel 13 which is of a width to frictionally grip the hose through the projections or knobs 15.

With the device thus supported on the hose same may be laid on the ground as indicated in Fig. 4 whereby the nozzle N is directed upwardly at a variable angle for the sprinkling of a lawn or flower bed.

The device is relatively small and light in weight and may accordingly be retained on the hose whereby the hose may be manually handled without removing the supporting device.

With the device thus attached, the hose may be manually manipulated in a sprinkling operation and on the occasion of any interruption same may be laid on the ground as in Fig. 4 whereby the sprinkling will be continued.

The supporting of the nozzle by the improved device close to the ground is of great advantage in windy weather under which circumstances the water spray is blown to positions not desired.

In Figs. 5 and 6 is disclosed a second embodiment of the invention and wherein the body 10a is of plastic and comprises two removable sections 17 each of which includes a half hub 18 and the two half hubs are removably connected by means of bolts extended through apertures 19 in ears 20 on the hub halves.

As indicated in Fig. 5, the hub halves have their faces drawn into contact while the adjacent edges of the disc segments 12a are in spaced relation with resulting slots 16a which provide give in the threading of the coupling C through the hub.

From the above it will be seen that a device is provided which is simple in construction, easily applied and highly effective in operation.

Having set forth my invention in accordance with certain specific structural embodiments thereof, what I claim and desire to secure by U. S. Letters Patent is:

1. A garden hose holder comprising a circular body member including a hub having a hose receiving opening extending axially therethrough and a disc extending radially from the hub adjacent each end thereof, said discs being concavo-convex with the convex sides thereof facing each other thereby providing a hose receiving annular channel of gradually reduced width from the mouth to the base thereof, and said convex sides of said discs being provided with knobs to provide a frictional grip between the discs and a portion of the garden hose adjacent the end thereof and with the holder disposed upon the hose at a distance from said end.

2. The structure according to claim 1 wherein the wall of said hub opening is threaded and said discs each being provided with a pair of slots extending radially outwardly from said hub opening.

3. The structure according to claim 1 wherein said body member comprises a pair of semi-circular sections having abutting engagement in the plane of the axis of said hub, and means removably holding said sections in engagement.

References Cited in the file of this patent

UNITED STATES PATENTS

| | | |
|---|---|---|
| 2,464,366 | Bakke | Mar. 15, 1949 |
| 2,584,543 | Brown | Feb. 5, 1952 |
| 2,648,507 | Kitzrow | Aug. 11, 1953 |